Figure 1:
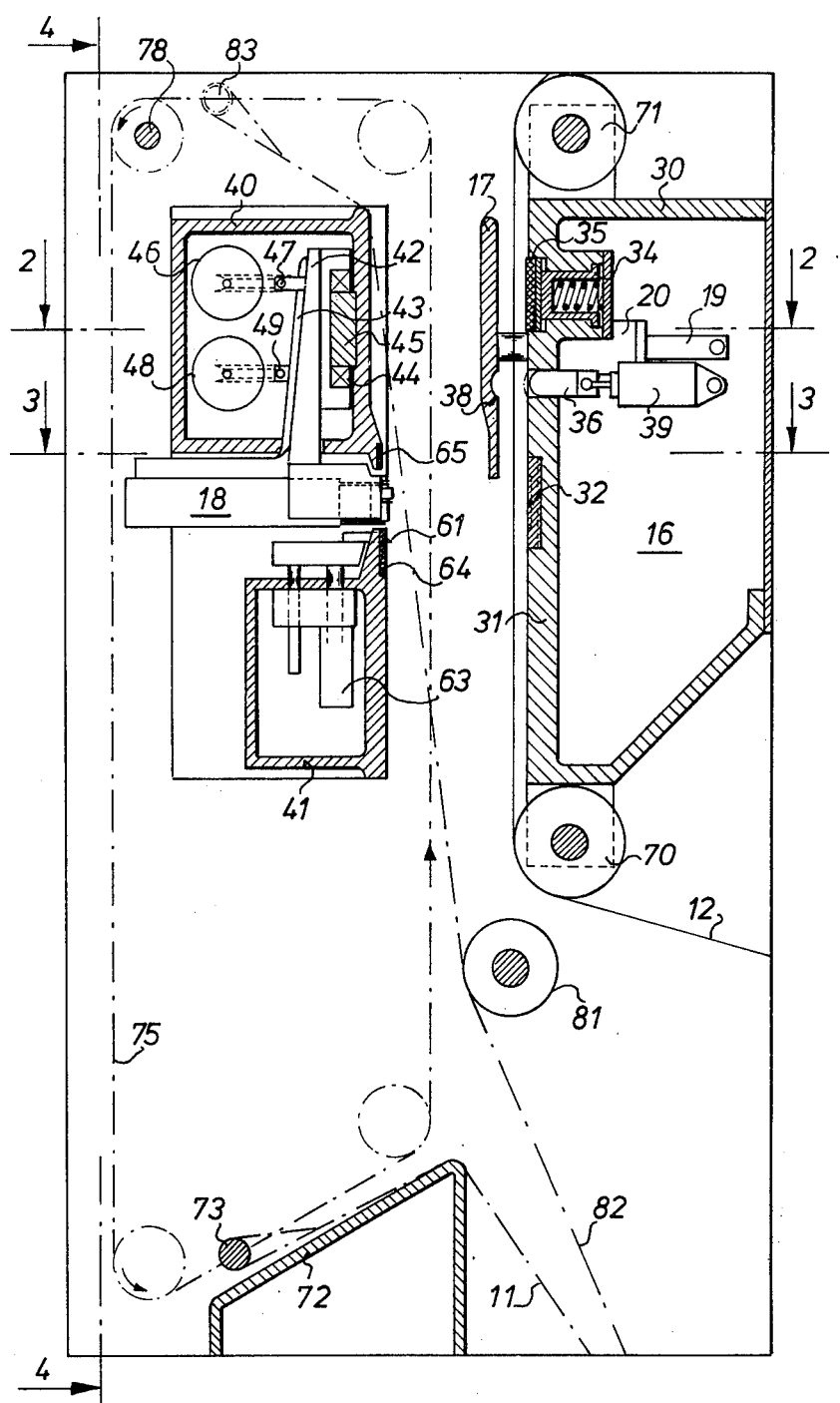

United States Patent [19]  [11] 4,120,739
Peeters et al.  [45] Oct. 17, 1978

[54] BUTT SPLICER FOR BUTT-JOINING A FRESH WEB TO A PROGRESSING WEB

[75] Inventors: Emiel Adriaan Peeters, s'Gravenwezel; Willy Lodewijk Pauwels, Schelle, both of Belgium

[73] Assignee: Agfa-Gevaert, N.V., Mortsel, Belgium

[21] Appl. No.: 738,049

[22] Filed: Nov. 2, 1976

[30] Foreign Application Priority Data

Nov. 19, 1975 [GB] United Kingdom ............... 47696/75

[51] Int. Cl.² ...................... B65H 21/00; G03D 15/04
[52] U.S. Cl. ................................................... 156/506
[58] Field of Search ............... 156/502, 505, 506, 507, 156/159, 517

[56] References Cited

U.S. PATENT DOCUMENTS

| 1,217,252 | 2/1917 | Williamson | 156/505 |
| 2,537,237 | 1/1951 | Rosser, Sr. | 30/304 |
| 3,514,363 | 5/1970 | Stone et al. | 156/505 |
| 3,746,599 | 7/1973 | Peeters et al. | 156/505 |

FOREIGN PATENT DOCUMENTS 1,333,083 10/1973 United Kingdom.

Primary Examiner—Douglas J. Drummond
Assistant Examiner—William H. Thrower
Attorney, Agent, or Firm—A. W. Breiner

[57] ABSTRACT

A butt splicer for butt-joining a fresh web to an expiring web, which comprises two relatively displaceable clamping members and one intermediate clamping member, which determine for the two webs common and separate clamping paths. The two webs are cut simultaneously while being on their common paths, one web is cut while being on a separate path, and the two webs are taped together after the strip of said one web comprised between the two cuts has been removed. Butt control means preferably cause a slight separation of the corresponding web end edges before the web ends are taped together.

14 Claims, 9 Drawing Figures

BUTT SPLICER FOR BUTT-JOINING A FRESH WEB TO A PROGRESSING WEB

The present invention relates to a butt splicer for butt-joining a fresh web to an expiring web.

In the operation of coating, printing and other machines wherein the coating printing and/or other operations are performed continuously on a moving web of paper, film, fabric or other material forming a flexible web and wherein the web is delivered to the machine from a roll, it is frequently necessary, shortly before the web on a roll has been consumed, to feed a fresh web to the machine without stopping it.

This is done by means of splicing apparatus wherein one or more tapes are adhered to the appropriately cut trailing end of the expiring web and to the leading end of the fresh web in order to join both webs to each other.

In United Kingdom Pat. No. 1,333,083 there is disclosed a butt splicer for butt-joining a fresh web to a running web wherein there are provided butt control means for causing a separation of the freshly cut web edges over a small distance before such web ends are taped together. The apparatus is characterized by a movable clamping member that in operation takes different successive positions with respect to a stationary clamping member and as a consequence thereof requires additional clamping means in the form of braked rollers, and of vacuum zones for keeping the webs immobile during the splicing operation. Another disadvantage of the mentioned apparatus is that the period of a splicing cycle amounts to an order of magnitude of 20 seconds as a consequence of the successive operative positions of the apparatus.

The present invention aims to provide an alternative butt-splicing apparatus which at least in its preferred embodiments is simpler of construction, and which, as a consequence of less successive manipulations for one splicing cycle, has a shorter splicing period and an increased dependability.

In accordance with the present invention, a butt splicer for butt-joining a fresh web to an expiring web, said splicer having portions thereof arranged to define adjacent aligned superposed paths for the webs, is characterised thereby that it comprises relatively displaceable clamping means for clamping, preparatory to splicing, said web portions firstly along a common path and subsequently along separate paths, considered according to the direction of movement of the webs, cutter means for cutting both webs transversely along a first line situated on said common path and for cutting one of said webs along a second line situated on a said separate path, means for removing the strips of said one web which is located between the two lines of cut, and means for applying a tape splice to the adjacent end portions of the webs produced by the cutting of the webs along said first line, while the webs are still clamped by the clamping means.

Preferred embodiments of the invention are as follows.

The relatively displaceable clamping means comprise a first clamping member which is mounted stationary on one side of the web paths, a second clamping member on the other side of the web paths which is movable and is arranged for displacement into and out of clamping engagement with said stationary member, and a third, intermediate, clamping member which has two opposed clamping surfaces and which is displaceably arranged between said first and second member for entering in clamping engagement with a portion of the clamping surfaces of said first and second clamping members as said first and second clamping members clampingly engage each other with at least an other portion of their clamping surfaces. Said third clamping member may be arranged for being urged against said first member by movement of the second member towards the first member.

The cutter means comprises a carriage that is arranged for displacement transversely of the webs and is provided with a first cutter blade that may co-operate with the clamping surface of a clamping member to cut both webs, with a second cutter blade that is mounted after the first blade, as seen in the direction of travel of the webs, and that remains remote of the clamping surface of said clamping member thereby to cut only the web that is remote from said clamping surface at that position. The carriage comprises a strip-removing member that is mounted between said first and second cutter blades and that has a plough-like configuration thereby to progressively peel said strip away from said webs as the carriage is moving across the webs and is cutting said strip.

In those cases where the webs must undergo delicate treatments such as the application of light-sensitive and other layers in the manufacturing of photographic materials by means of applicators that are very closely spaced from the surface of the web to be coated, such as cascade and extrusion coaters, it is highly important that the thickness of the web does not markedly increase locally because any thickened web portion may disturb the coating bead between the applicator and the web.

Previously known apparatus for butt-joining webs wherein the webs are severed simultaneously while being pressed onto each other, and wherein a thin and strong self-adhesive tape is stuck on the severed web ends at one side of the webs after the cut-off portion of the web at that side has been removed, have not always given good results since the severing of web ends which are firmly pressed onto each other and which are held immobile, did not always provide two web edges which accurately abut against each other. It occurs frequently that the edge of one web overlies partly the extremity of the other web as a consequence of improper cutting or clamping, so that the thickness of the web at the joint is not only increased by the thickness of the joining tape, which usually is a fraction of the web thickness, but also by a value which may even equal the thickness of the web.

The butt splicer according to the present invention affords a better control of the freshly cut web end edges, as compared with the prior art apparatus, because of the gripping of the web ends by fewer parts moving during the splicing cycle. Yet, it may be desirable to control the butt joint in such manner that, in any way there is an edge separation of, say at least 0.1 to a maximum 0.3 mm, in order to exclude any possible adverse effect of an improper cut edge, for instance as a consequence of a blunt cutting blade. Therefore, the apparatus according to the present invention may incorporate butt-control means operative to displace one of the freshly cut web end edges over a small distance away from the other such end edge before such web ends are taped together.

Figure 3:
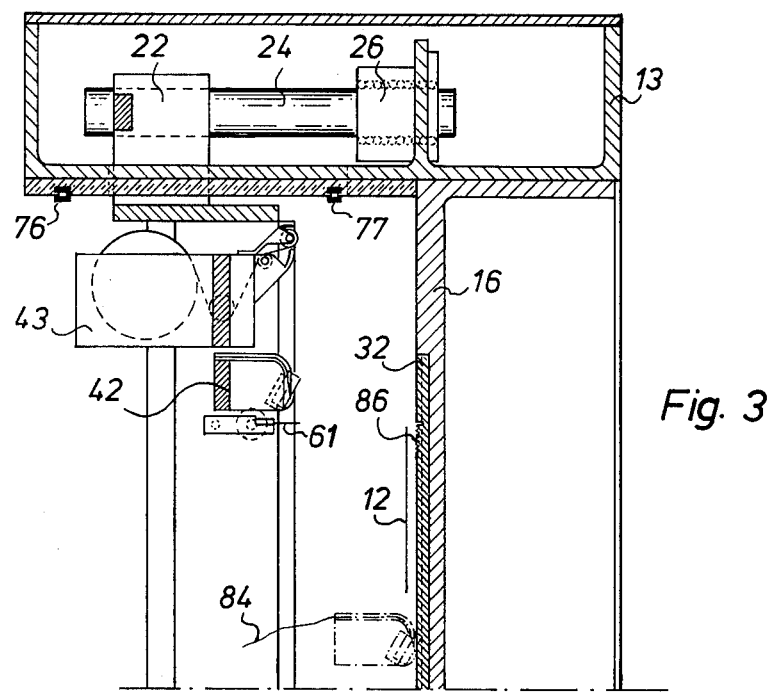
Figure 2:
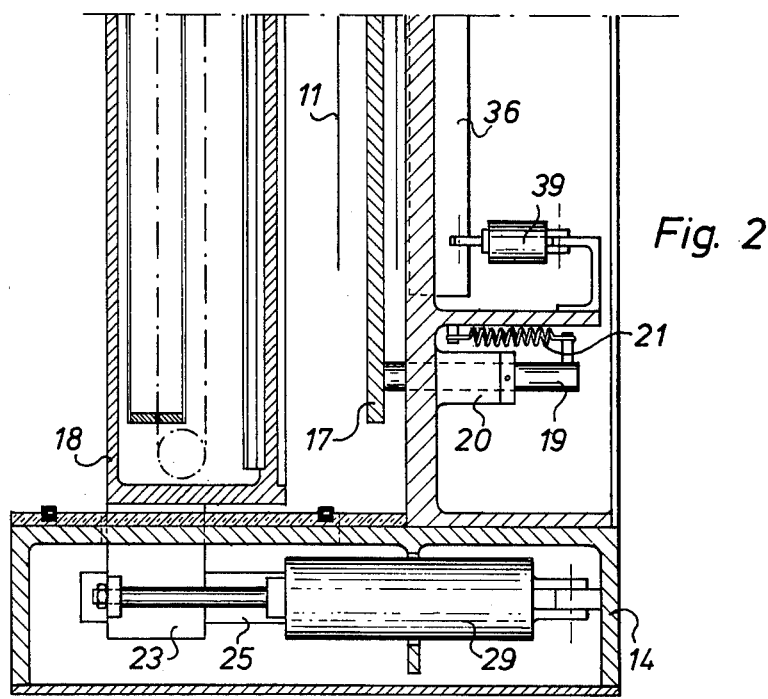
Figure 4:
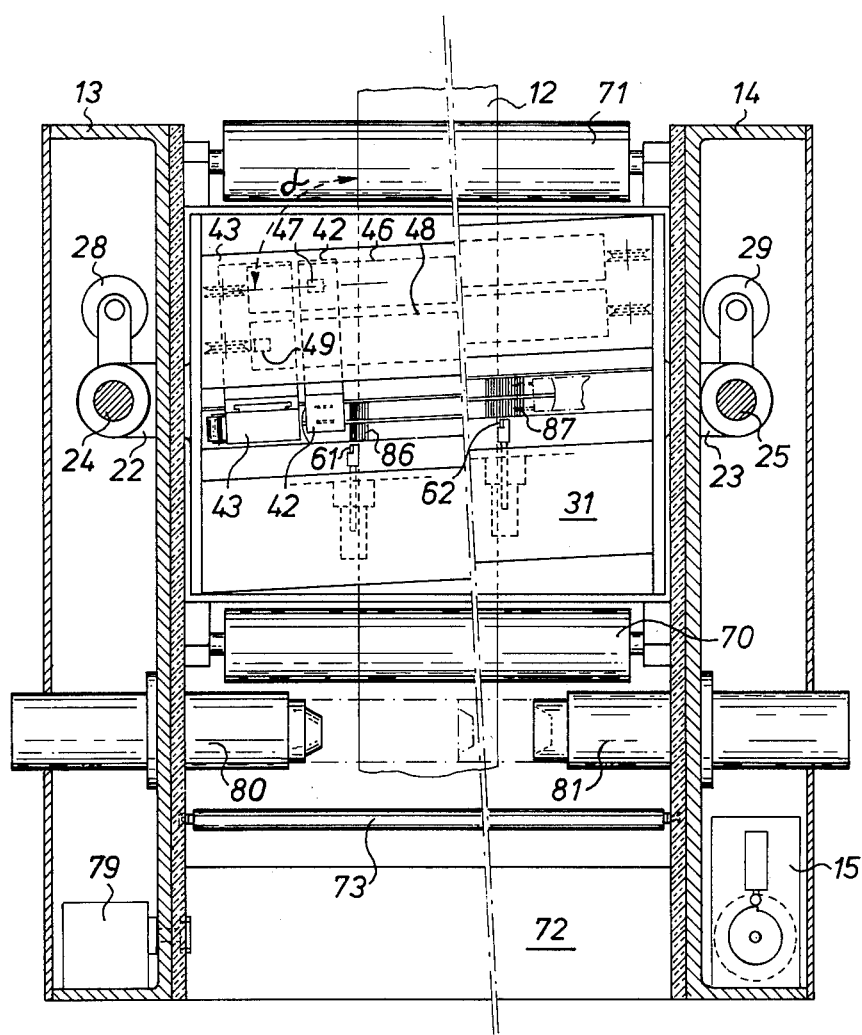
Figure 5:
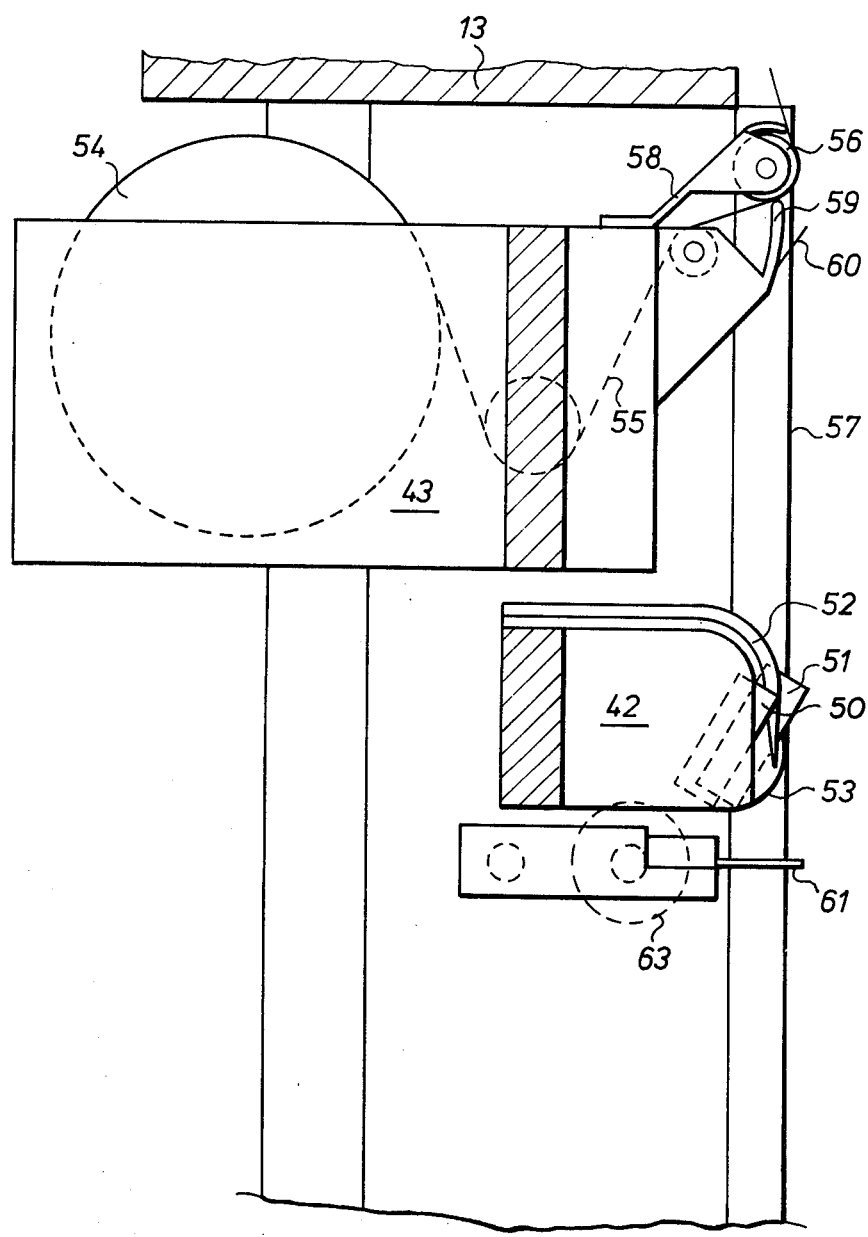
Figure 6:
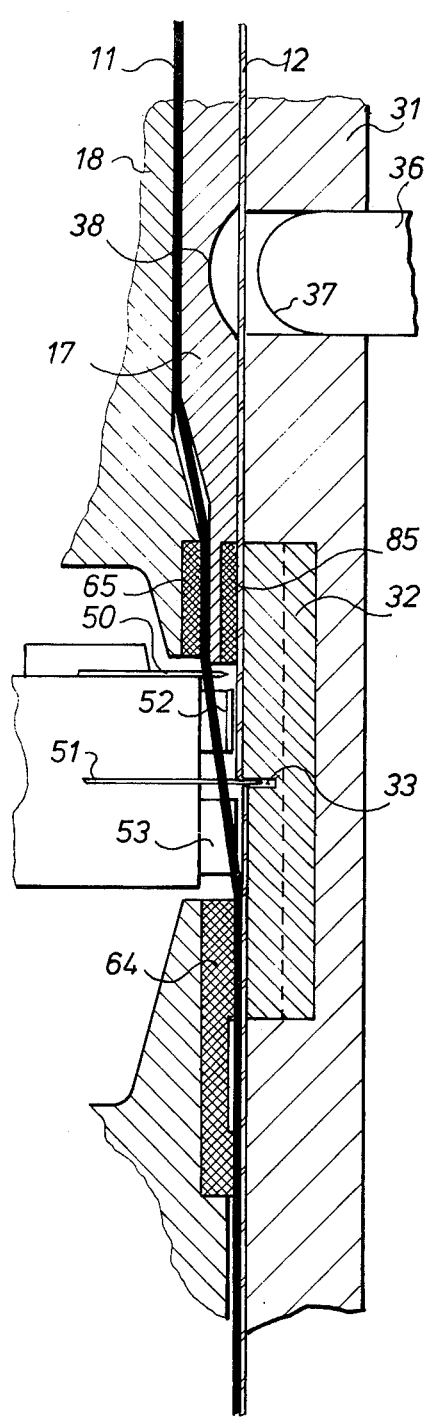
Figure 7:
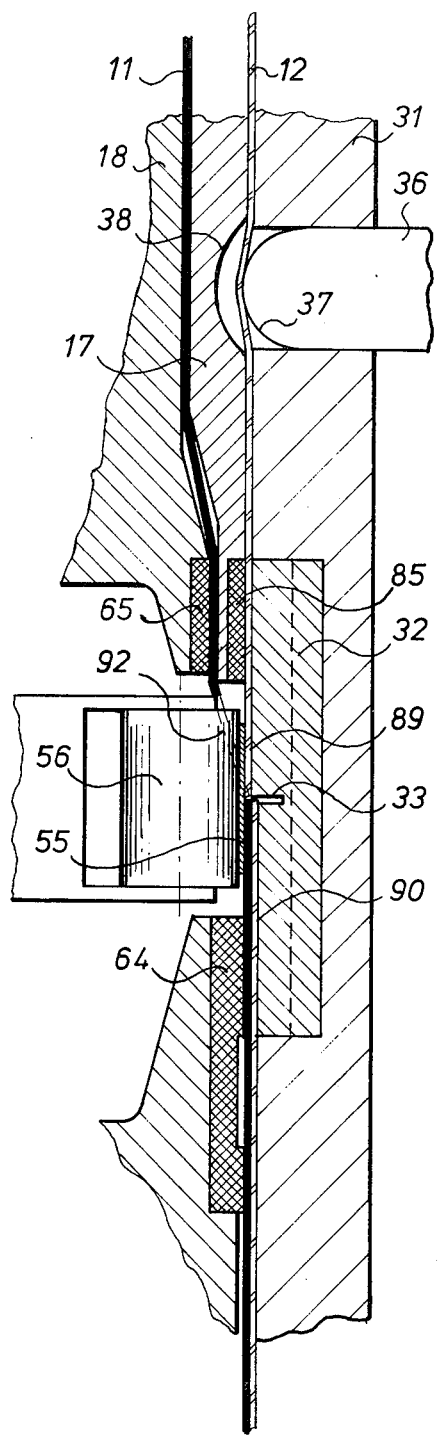
Figure 8:
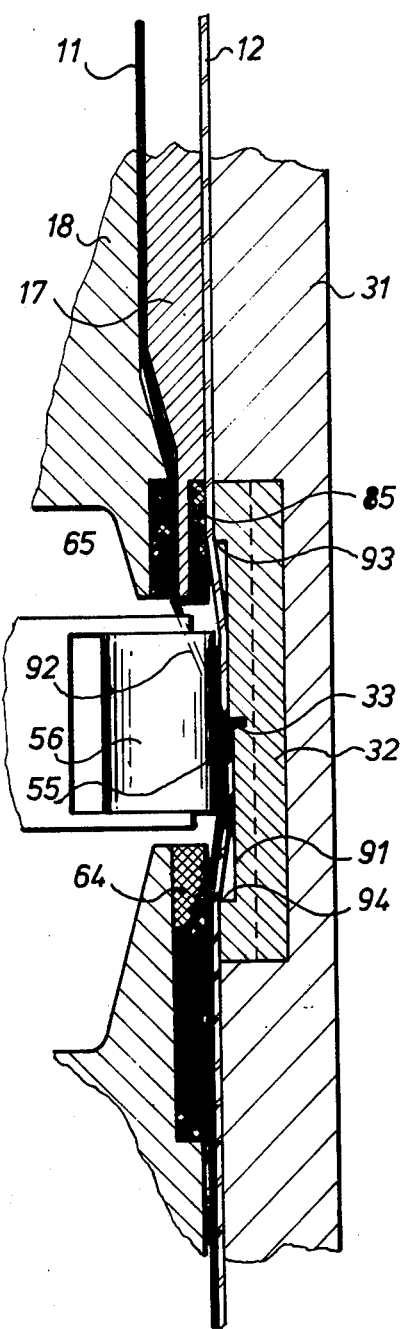

The invention will be described hereinafter by way of example with reference to the accompanying drawings wherein:

FIG. 1 is a diagrammatic vertical sectional view showing the apparatus according to the invention in inoperative position, FIG. 2 is a partial horizontal section on line 2—2 of FIG. 1, FIG. 3 is a partial horizontal section on line 3—3 of FIG. 1, FIG. 4 is a front elevational view on line 4—4 of FIG. 1 of the movable clamping member of the apparatus, FIG. 5 is a view in detail of FIG. 3 of the carriage with the splicing tape, and of the carriage with the cutter blades and the plough for removing the cut web strip, while in inoperative position, FIG. 6 is an enlarged sectional view of the splicing zone of FIG. 1, the cutter carriage and the butt-control means being in inoperative position, FIG. 7 is an enlarged sectional view of the splicing zone, the carriage with the splicing tape and the butt-control means being in the operative position, FIG. 8 is an enlarged sectional view of a modified splicing zone, the carriage with the splicing tape being in the operative position.

Figure 9:
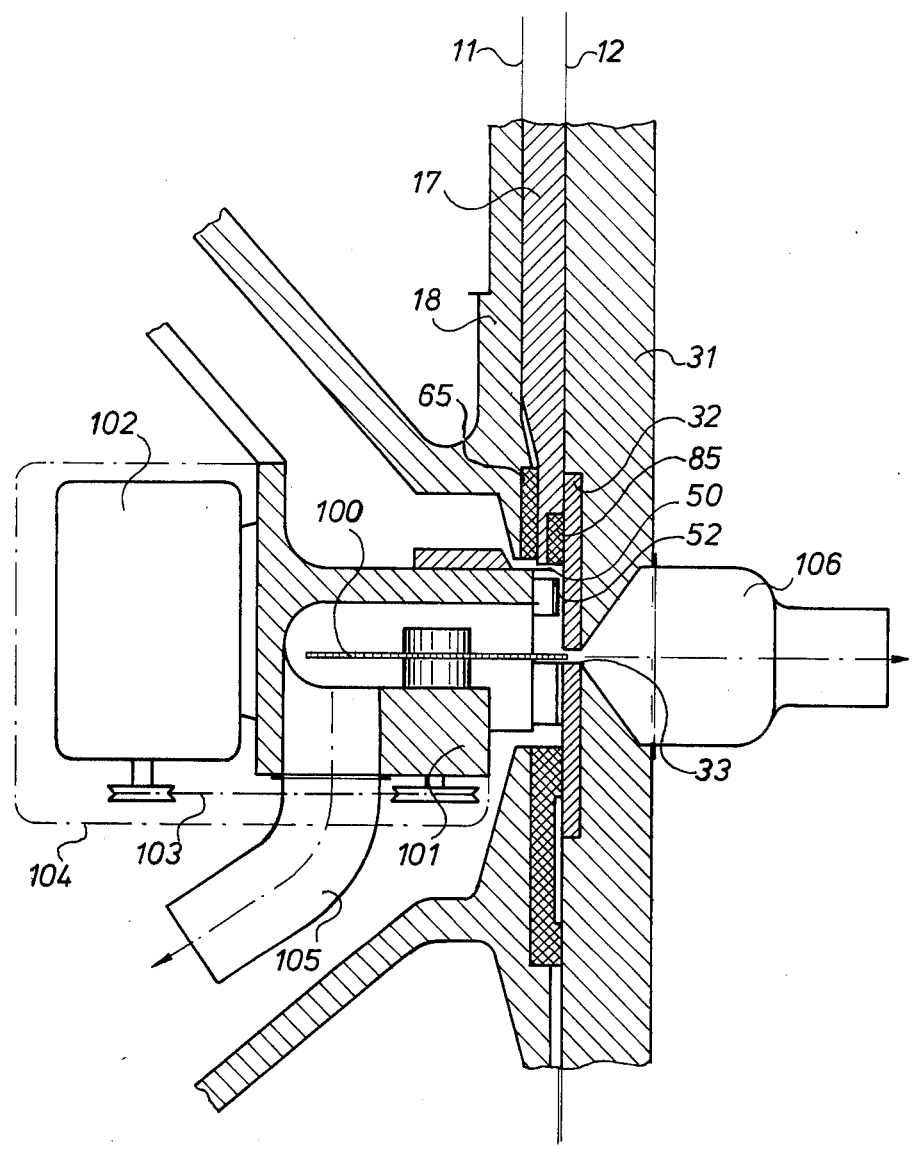

FIG. 9 is an enlarged sectional view of a modified butt control mechanism, the cutter carriage being in the inoperative position.

The butt splicer shown in FIGS. 1 to 4, is an apparatus wherein a fresh web 11 may be butt-joined to an expiring web 12. The webs may be fed from any source, the most current source being a rotatable roll turret wherein two or more web rolls are rotatably supported, and wherein the roll of fresh web material may be swung in the place of the roll of the consumed web after the fresh web has been joined to the expiring web.

The apparatus is mounted between two vertical supporting columns 13 and 14 which are spaced apart and which are fixed to the floor. Within the columns there are mounted different air motors, an electric motor 79 for controlling the rod for the introduction of the fresh web in the apparatus, and a cam shaft mechanism 15 for controlling the operation of the apparatus.

Three clamping members 16, 17 and 18 extend between the supports transversely with respect to the path followed by the webs through the apparatus. The member 16 is fixedly supported between the two columns whereas the members 17 and 18 are arranged for displacement towards and away from the fixed member in a direction normal thereto. To this end, the member 17 is provided near its lateral ends with rods that may slide in stationary sleeves fitted to the fixed member 16, such as the rod 19 and the sleeve 20 illustrated in FIGS. 1 and 2. Tensions springs such as the spring 21 ensure an inoperative position of the clamping member 17 as shown in said figures.

The clamping member 18 is provided with lateral supports 22 and 23 which extend through corresponding horizontal elongate openings in the columns and which are attached to rods 24 and 25 which are journalled for axial displacement in bushings such as the bushing 26 shown in FIG. 3. The position of the member 18 is controlled by air motors 28 and 29 (FIG. 4).

The stationary clamping member 16 comprises a box-like structure 30 which is provided with a clamping plate 31. At the clamping side of said plate, there is incorporated a cutting plate 32 with a groove 33, see FIGS. 6 and 7, for co-operation with one of the cutting blades to be described hereinafter.

The clamping plate 31 of the member 30 is provided with a spring-loaded clamping bar 34 which is provided with a resilient covering 35 which projects out of the clamping surface of the plate 31 in inoperative position and may lie flush with said clamping surface in operative position. Finally, the clamping member 16 is provided with a butt control member in the form of an elongate bar 36 which extends transversely of the web path and which has a rounded-off edge 37. The bar is mounted for movement in a direction towards the clamping member 18 so that in the operative position of the bar its edge 37 may project out of the clamping surface of the clamping plate 31 as shown in FIG. 7. A groove 38 in the clamping member 17 permits the mentioned operation of the butt control bar which is controlled by air motors such as the motor 39 shown in FIGS. 1 and 2.

The displaceable intermediate clamping member 17 has a wedge-shaped cross-sectional form at its lower end. The purpose thereof is to avoid that the path of the web 11 would too strongly diverge from the path of the web 12 in the cutting zone, what would be the case indeed if the cross-sectional thickness of the member 17 would be uniform until the lower edge thereof.

The displaceable clamping member 18 has two box-like structures 40 and 41 wherein the web cutting and taping means, and the tape trimming means respectively, are mounted. The web cutting and taping means are mounted on carriages 42 and 43 which are displaceable by means of appropriate bearings 44 along an elongate bar 45, see FIG. 1. The movement of the carriage 42 is controlled by an air motor 46, the piston of which is coupled at either side by means of cables running over appropriate wheels, shown in broken lines in FIG. 4, to an arm 47 which is fitted to the carriage 42. In a similar way, the carriage 43 is coupled by an arm 49 to an air motor 48.

The web cutting carriage 42 is provided with stationary cutter blades 50 and 51 (see FIGS. 5 and 6), the cutting extremities of which extend unequally far for the purpose that will be described hereinafter.

The cutter blades are so arranged that their points of cutting are shifted, with respect to the transverse direction of the webs, so in the present case, this means that the blade 50 starts first cutting through the web 11 (see FIG. 5), and it is only after a small part of the web has been cut, say a width comprised between 2 and 5 mm, that the blade 51 enters in cutting contact with the webs 11 and 12 as the cutting carriage 42 progresses transversely of the webs. The reason for this difference is that the blade 50, which has no counter blade or knife, now may cut through a firmly tensioned section of the web 11, the cutting by the blade 51 raising no problems because the webs are firmly supported by the plate 32. If, on the contrary, the blade 51 would start cutting first, or start the cutting together with the plough-like member 52, which is mounted between the cutter blades, then the tensioning of the web section being cut by the blade 50 might be insufficient to realize an acceptable cutting. Said plough-like member 52 that is formed by a rigid metal strip, curved over about 90 degrees and terminating in a tapered extremity. At the side of the blade 51 opposite to the side where the plough 52 is located, there is mounted a leaf-spring 53 the free end of which is smoothly curved over about 90° in a direction opposite to that of the curvature of the plough 52, as may be seen in FIG. 5.

The taping carriage 43 is arranged for rotatably supporting a roll 54 of self-adhesive tape 55 with the adhesive layer wound towards the interior of the roll. The tape is pulled over suitable guide rollers and may be applied by a tape applicator roller 56 onto the corresponding web ends in the operation of the butt-joining splicer. The applicator roller 56 extends in inoperative position somewhat beyond the plane in which the webs are taped together, said plane being indicated by the drawn line 57 in FIG. 5. The bracket wherein the roller 56 is mounted has a flexible zone 58 so that the roller 56 may be urged slightly backwards as the displaceable clamping member 18 takes its operative position against the member 16. In the rest position of the roller 56 as illustrated in FIG. 5, it contacts the free edge of a slightly curved rigid finger 59 fitted to the carriage 43 so that the position of the free end of the tape is well determined. To the finger 59 is attached a flexible finger 60 which projects with its free end slightly beyond the clamping plane 57, and the function thereof will be described hereinafter.

The tape trimming means which are mounted in the box-like structure 41 comprise two small trimming blades 61 and 62, see FIGS. 1, 4 and 5, that are located closely beside the path followed by the webs through the apparatus, and that may cut off the ends of tape extending at either side of the web splice after the webs have been joined to each other. The blades may be actuated by an air-motor such as the motor 63 shown, thereby to be moved upwardly over a distance that is slightly greater than the width of the tape used for the splicing of the webs.

The clamping face of the displaceable member 18 is finally provided with two elongate pressure strips 64 and 65 of resilient material, for instance butyl rubber or the like, the length of which slightly exceeds the width of the webs to be treated. The pressure strip 64 is intended for co-operation with the clamping surface of the stationary clamping plate 31 and its clamping surface has a slightly recessed central portion in order to reduce wrinkling of the web material, whereas the pressure strip 65 may co-operate with the corresponding surface of the intermediate clamping member 17.

In the foregoing description of the various elements for clamping, cutting and joining the webs, the term "transversely" has been used to indicate the relative position of said elements with respect to the longitudinal direction of the web. Actually, the position of said elements is not exactly normal to the longitudinal direction of the web, but it rather makes an angle which amounts to about 93° as indicated by the angle α in FIG. 4. In this way, a web joint is obtained which runs slightly obliquely, so that a smoother passage of the joint over the different rollers of the web treating installations is obtained. The said term should, therefore, be construed sufficiently broad to include also such oblique mounting.

The expiring web 12 is pulled through the butt splicer over freely rotatable rollers 70 and 71, see FIG. 1. The fresh web 11 is treated as follows before the splicing step of the webs is started. The operator pulls the leading end of the fresh web on a preparation table 72 and he folds the leading end of the web round a rod indicated by numeral 73. The web end may be fixed to the rod in any known way, for instance by taping or gluing. The rod 73 extends transversely between the columns 13 and 14 and is attached with each extremity to an endless sprocket chain 75 that runs over four sprocket wheels, shown in dash and dot lines in FIG. 1. The walls of the columns 13 and 14 are recessed in such a way that the sprocket wheels and chains lie flush with the outer surface of said walls, thereby to reduce the risk for the operator to be gripped by parts of the chain mechanism. The recessed construction is illustrated by the grooves 76 and 77 in the inner wall of the column 13 in FIG. 3. The sprocket chains at either side of the web path are synchronized by means of a shaft 78 which one sprocket wheel of each chain mechanism is fitted. The shaft 78 is drivingly coupled to an electric motor 79 that controls the movements of the chains during the preparation and the carrying out of the web splicing operation. Finally, the butt splicer is provided with two guide members 80 and 81, see FIGS. 1 and 4, that are arranged for axial movement in the corresponding columns 13 and 14, and that guide in their operative position, that is the position wherein their opposed end faces engage each other as shown in broken lines in FIG. 4, the fresh web 11 along a path as indicated by the dash and dot lines 82 in FIG. 1 preparatory to splicing. In this way it may be prevented that the web 11 could possibly be pulled by the rod 73 during the upward movement thereof against the web 12 at the place of the roller 70. In inoperative position, the guide members are removed from each other so as to not interfere with the path of the webs.

The operation of the butt splicer will now be described, assuming that the leading end of a roll of fresh web material is prepared as described hereinbefore, and that the expiring web runs through the apparatus to a further installation for the continuous treatment of the web, an accumulating device being provided between the butt splicer and said further installation to permit the temporary arrestment of the web during the splicing interval.

The operator pushes a start button to start the cam shaft mechanism 15 which is arranged for controlling the air admittance to the various air motors over the period of one revolution, as well as the rotation of the electric motor 79 driving the sprocket chains in timed relation, so that the following operations occur in sequence.

First, the rod 73 is moved to draw the fresh web 11 upwardly between the inoperative clamping members. The rod motion is arrested when the position 83 indicated in broken lines in FIG. 1 has been reached.

Second, air is admitted to the air motors 28 and 29 so that the displaceable clamping member 18 is pressed against the stationary clamping member 16. The intermediate clamping member 17 is carried by the movement of member 18 so that an operative clamping position of the members is obtained as illustrated by the enlarged sectional view of the splicing zone in FIGS. 6 and 7. Third, air is admitted to the air motor 46 whereby the web cutter carriage 42 is pulled towards the opposite lateral side of the apparatus. During this movement, the cutting blade 51 co-operates with the groove 33 in the plate 32 to cut through both clamped webs, whereas the cutting blade 50 cuts through the web 11 only, as may be seen in FIG. 6. Also during this movement of the carriage, the plough 52 progressively removes the strip of the web 11 that is comprised between the lines of cut by the blades 50 and 51 and delivers this strip along a path that is diagrammatically illustrated for a momentary position of the carriage by the numeral 84 in FIG. 3. The spring leaf 53 presses the extremity of the web 11 below the blade 51 against the plate 32 during the peeling away of the strip portion, see FIG. 6.

Fourth, as the web cutter carriage has reached the end of its course, air is admitted for a brief while to the air motors, such as the motor 39, controlling the butt control bar 36, in order to advance the bar until its free edge 37 takes a position as indicated in FIG. 7. This introduces a slight bow in the web 12 and as a consequence, the web portion which is comprised between said butt control means and the cutt-off edge is pulled upwardly, since the clamping pressure between the member 17 and the wall 31 is not so high that the web would be torn off by the butt control bar, and the clamping pressure exerted on the web by the resilient strip 35 located after the butt control bar is greater than the clamping pressure produced by the small resilient strip 85 provided at the lower extremity of the intermediate clamping member 17. The distance over which the freshly cut edge of the web 12 is displaced may be comprised between 0.1 and 0.3 mm.

Fifth, the air motor 48 is actuated so that the tape carriage 43 is pulled towards the opposite edge of the web. During the movement of the tape applicator, the roller 56 firmly presses the self-adhesive tape onto the ends of the webs 11 and 12. The progressive application of the tape to the web ends ensures a perfect adhesion of the tape without the inclusion of air bubbles, which possibly may form humps in the splice.

Sixth, the air motors, such as motor 63, of the tape trimming blades are actuated so that the ends of tape that protrude at either side of the web are cut off. Said cut-off tape ends adhere to the surface of the cutting plate 32 and they may remain occasionally there during a number of consecutive splicing operations, each splicing adding a further cutt-off tape end onto the foregoing ends. Depending on the thickness of the tape, the collected ends may be removed by hand from the plate 32 after a number of splicing operations. The removal of a tape end from the surface of the plate 32 is facilitated by zones 86 and 87, see FIG. 4, where the surface of the plate 32 has been roughened, for instance by the milling of a series of small parallel grooves, in order to reduce the adherence of a tape to the plate surface.

Finally, the air pressure supply to the air motors 28 and 29 is reversed so that the clamping member 18 is withdrawn from the member 16 into the inoperative position. The intermediate clamping member 17 is induced by the spring means 21 to follow the retracting movement of the member 18 so that the spliced webs now may follow a free path that is tangential to the rollers 70 and 71, so that the web travel may be restarted. The restarting of the web travel may proceed in a known way by means of a microswitch that is actuated by the withdrawing clamping member 18, and that controls the turret motor for the rotation of the roll of fresh web 11, as well as the web driving means that is situated after the butt splicer and that has been arrested during the splicing operation.

The air motors 48 and 46, see FIG. 1, are actuated to bring the tape carriage and the cutter carriage into their initial position. The mechanism controlling the rod 73 is actuated to bring the rod from the position 83 shown in broken lines into the initial position drawn in full line, whereafter the operator can remove the remaining end portion of the fresh web 11 and prepare another fresh web for the next splicing operation.

In the butt splicer described hereinbefore, the web ends to be taped together are located in the same plane as the corresponding adjacent web portions that are clamped by the clamping means. A slight level difference of the surface portions 89 and 90 at either side of the groove 33 in the cutting and the supporting plate 32, see FIG. 7, ensures that also the web end faces to be taped together are located in the same plane. The described configuration is the cause therefore that additional means such as the butt control bar 36 is required in case the freshly cut web edges have to be slightly displaced from each other in order to avoid any possible web overlapping at the joint.

A modified mechanism that does not show the mentioned disadvantage is illustrated in FIG. 8. The operative surface of the cutting plate 32 has a zone 91 that is recessed with respect to the outer surface of the plate that lies flush with the web clamping surface of the wall 31. The cutting of the webs proceeds as described hereinbefore, the webs taking generally a position as illustrated in FIG. 6, except for the fact that they follow slightly inclined paths towards the cutting groove 33. As the webs are taped together, the cut off strip 92 indicated in broken lines being removed, the adjacent web ends are applied onto the surface 91 of the plate 32 over a distance that corresponds with the width of the tape applicator roller 56. Thereby both web ends are slightly removed from each other since the interrupted web paths from the edges 93 and 94 towards the groove 33 are longer than the rectilinear web paths from such ends to such groove.

The taping carriage 43 may move together with the web cutter carriage 42 since, in contrast with the butt splicer according to FIGS. 1 to 7 wherein the butt control bar can only become operative after the webs have been completely cut, the separation of the freshly cut web edges now occurs by the taping carriage. As a consequence thereof, the splicing time of the mechanism according to FIG. 8 may be shorter than that of the mechanism according to FIGS. 1 to 7.

Another point in favour of the butt splicer according to FIG. 8 is that it is better suited than the butt splicer according to FIGS. 1 to 7 for the treatment of thick or relatively stiff web material, since the bow-shaped deflection of a web by means of the butt control bar 36 of this latter apparatus may give rise to difficulties in the case such thick webs are treated. Dimensions that are indicative of webs considered as relatively thick or stiff in the present specification, are a web weight greater than 200 g/sq.m for paper, or a thickness greater than 0.15 mm for polyethylene terephthalate film.

In the drawing of FIG. 8 the broken web paths have been illustrated as having their discontinuity at the edges of the adhesive tape 55 but it will be understood that actually said points of discontinuity may be determined by the edges of the roller 56, the thickness of the tape being practically neglectable as compared with the distance over which the roller extends at either side about the tape.

Still another mechanism for ensuring that the freshly cut web edges are remote from each other over a distance ranging from one millimeter to some tenths of a millimeter, to prevent any possible web overlapping at the joint, is illustrated in FIG. 9. The mechanism corresponds generally to the mechanism illustrated in FIGS. 6 and 7, with the exception that the cutter blade 51 has now been replaced by a milling cutter disc 100 for simultaneously cutting both webs, and that the butt control bar mechanism 36 has been deleted. The milling cutter disc has a thickness of 0.2 mm and is rotatably journalled in a support 101. Rotation of the disc may occur by a motor 102 through the intermediary of a belt 103. The complete milling mechanism is mounted in an airtight housing that is diagrammatically indicated by the dash and dot line 104 and that may be attached to, or form part of, the cutter carriage 42 (see FIGS. 4 and 5). The housing 104 is provided with an exhaust conduit 105 that may be connected to a vacuum source via a suitable hose, not shown, to remove fibres and dust from the webs produced thereon by the milling operation.

The groove 33 in the plate 32 has a width slightly greater than the thickness of the milling disc 100 so that the rim portion of the milling disc may protrude into the plate 32 over a distance of some tenths of a millimeter. The groove 33 merges into a widened outlet channel 106 that may likewise be connected to a suitable vacuum source for removal of milled web particles.

In the operation of the mechanism the two webs 11 and 12 are cut simultaneously by the milling cutter disc 100, the web 11 is cut a second time by the cutter blade 50, and the portion of the web 11 that is comprised between the two lines of cut is removed by the plough 52. No relative displacement of the freshly cut web edges is required to create an opening between them, since said opening, in the present case it is measuring 0.2 mm, has already been obtained up from the moment of cutting both webs. The described technique has the advantage that the web ends to be taped together are not displaced after they have been cut, whereby the parallelism between the opposed web edges may be virtually perfect so that the separation distance between both edges may even further be reduced without running any risk both web ends would overlap.

The following example illustrates the apparatus according to the invention.

Two polyethylene terephthalate webs having a width of 1,750 mm and a thickness of 0.15 mm were joined by means of the butt splicer according to FIGS. 1 to 7. The width of the tape 55 was 25 mm and the thickness was 0.06 mm. The butt control bar was so adjusted that the separation between the edges of the two joined 0.2 was 0.02 mm. The total splicing time for the webs amounted to 15 seconds.

A butt splicer in accordance with FIG. 8 was capable of joining two webs with the same accuracy as that produced by the splicer according to FIGS. 1 to 7, in 11 seconds.

It will be understood that the invention is not limited to the described embodiments. The butt splicer in accordance with the present invention need not necessarily comprise but control means for producing a separation between the abutting edges of the two webs. Depending on the type of webs to be spliced, the accuracy and the quality of cutting, the permissibility for conducting the webs or at least their splice zone between a pair of squeegee or pressure rollers, and the subsequent treatments to be given to the webs, the butt splicer may also operate without any edge displacement of the webs and in such case the web cutting and the web taping carriages may as well be coupled with each other, or replaced by one carriage thereby to simplify the construction of the apparatus.

We claim:

1. A butt splicer for butt-joining a fresh web to an expiring web, said splicer having portions thereof arranged to define adjacent aligned superposed paths for the webs, which splicer comprises relatively displaceable clamping means for clamping, preparatory to splicing, said web portions firstly along a common path and subsequently along separate paths, considered according to the direction of movement of the webs, cutter means arranged for displacement transversely of the webs for cutting both webs progressively transversely along a first line situated on said common path and for cutting one of said webs along a second line situated on a said separate path, means for removing the strip of said one web which is located between the two lines of cut, and means for applying a tape splice to the adjacent end portions of the webs produced by the cutting of the webs along said first line, while the webs are still clamped by the clamping means.

2. A butt splicer according to claim 1, wherein the cutting of the webs occurs simultaneously along said two lines.

3. A butt splicer according to claim 1, wherein said relatively displaceable clamping means comprise a first clamping member which is mounted stationary on one side of the web paths, a second clamping member on the other side of the web paths which is movable and is arranged for displacement into and out of clamping engagement with said stationary member, and a third, intermediate, clamping member which has two opposed clamping surfaces and which is displaceably arranged between said first and second member for entering in clamping engagement with a portion of the clamping surfaces of said first and second clamping member as said first and second clamping members clampingly engage each other with at least an other portion of their clamping surfaces.

4. A butt splicer according to claim 3, wherein said intermediate clamping member is arranged for being urged against said first member by movement of the second member towards the first member.

5. A butt splicer according to claim 1, wherein said cutter means comprises a carriage that is arranged for displacement transversely of the webs and is provided with a first cutter blade that may co-operate with the clamping surface of a clamping member to cut both webs, and with a second cutter blade that is mounted after the first cutter blade, as seen in the direction of travel of the webs, and that remains remote of the clamping surface of said clamping member, thereby to cut only the web that is remote of said clamping surface in that position.

6. A butt splicer according to claim 5, wherein both cutter blades are so arranged that their points of cutting, considered according to the transverse direction of the webs, do not coincide, the cutting by the second blade starting before the cutting by the first blade.

7. A butt splicer according to claim 5, wherein said carriage comprises a strip-removing member that is mounted between said first and second cutter blade and that has a plough-like configuration thereby to progressively peel said strip away from said webs as the carriage is moving across the webs and is cutting said strip.

8. A butt splicer according to claim 1, wherein there is provided butt-control means operative to displace one of the freshly cut web end edges over a small distance away from the other such end edge before such web ends are taped together.

9. A butt splicer according to claim 8, wherein said butt control means comprises a member extending transversely of the web path and displaceable perpendicularly of one of said separate web paths against one web end portion to displace the same in bowed fashion out of said path and consequently move the cut edge of the displaced end portion away from the cut edge of the other end portion.

10. A butt splicer according to claim 8, wherein said butt-control means is formed by a portion of the clamping surface of the clamping member that co-operates with the blade for cutting along said first line, that is recessed with respect to the remaining clamping surface of said member, so that the cutting of said webs by said cutter means causes a deviation of the paths of the web ends along straight lines, and the taping of said web ends causes a deviation of the paths of said web ends along broken lines, thereby to consequently slightly displace the cut web ends from each other before the taping together occurs.

11. A butt splicer according to claim 1, wherein said cutter means for cutting both webs transversely along a first line situated on said common path is arranged for milling said webs, thereby to remove a slight amount of web material and to produce corresponding web ends that are separated from each other over a distance ranging from one millimeter to some tenths of a millimeter.

12. A butt splicer according to claim 11, wherein said cutting means is formed by a rotatable milling cutter disc.

13. A butt splicer according to claim 1, wherein said cutter and said strip removing means are arranged for simultaneous movement.

14. A butt splicer according to claim 1, wherein said cutter means, said strip removing means and said taping means are arranged for simultaneous movement.

* * * * *